United States Patent [19]

Nitta et al.

[11] Patent Number: 4,828,623

[45] Date of Patent: May 9, 1989

[54] WATER RESISTANT NACREOUS PIGMENT AND PROCESS FOR PRODUCING THE SAME

[75] Inventors: Katsuhisa Nitta, Fukushima; Takaji Watanabe, Saitama; Isao Suzuki, Fukushima, all of Japan

[73] Assignee: Merck Patent Gesellschaft mit beschrankter Haftung, Darmstadt, Fed. Rep. of Germany

[21] Appl. No.: 123,474

[22] Filed: Nov. 20, 1987

[30] Foreign Application Priority Data

Nov. 21, 1986 [JP] Japan .................................. 61-276687

[51] Int. Cl.$^4$ .............................................. C04B 11/20
[52] U.S. Cl. ...................................... 106/450; 106/417
[58] Field of Search .................... 106/291, 308 B, 299, 106/417, 450

[56] References Cited

U.S. PATENT DOCUMENTS

| | | | |
|---|---|---|---|
| 3,087,828 | 4/1963 | Linton | 106/417 |
| 3,832,208 | 8/1974 | Jackson | 106/417 |
| 3,874,890 | 4/1975 | Bernhard et al. | 106/291 |
| 4,457,784 | 7/1984 | Bernhard | 106/291 |
| 4,505,755 | 3/1985 | Shinozuka et al. | 106/308 B |
| 4,565,581 | 1/1986 | Bernhard | 106/291 |

FOREIGN PATENT DOCUMENTS

3221045 12/1983 Fed. Rep. of Germany.

*Primary Examiner*—Prince E. Willis
*Assistant Examiner*—Christine A. Skane
*Attorney, Agent, or Firm*—Millen & White

[57] ABSTRACT

A process for the production of a water-resistant nacreous pigment, comprising hydrolyzing a zirconium or zirconyl compound, in the presence of a hypophosphite and in the presence of a metal oxide-coated mica flake pigment, whereby a hydrated zirconium oxide is deposited onto the surface of the metal oxide-coated mica flake, and a nacreous pigment comprising metal oxide-coated mica flakes coated with hydrated zirconium oxide.

12 Claims, No Drawings

WATER RESISTANT NACREOUS PIGMENT AND PROCESS FOR PRODUCING THE SAME

BACKGROUND OF THE INVENTION

Coatings for outdoor uses, for example, coatings for the exterior of automobiles, must be capable of providing a coated film whose surface appearance remains unchanged even when it is exposed to various weather conditions As is well known, in the case where titanium oxides are contained in a coated film, polymers that constitute the flm tend to be oxidatively decomposed by ultraviolet rays and moisture, thereby causing whitening or so-called chalking of the coating. In order to suppress such an activity of titanium dioxide, the generally employed titanium dioxide pigments are stabilized by various techniques, for example, by covering titanium dioxide with chromium compounds, silicon compounds, aluminum compounds, zinc compounds, phosphorus compounds, zirconium compounds or a combination of these compounds, or by doping such compounds into titanium dioxide. Aluminum flake pigments have been used as a coating for the exterior of automobiles. However, as is well known, the appearance of coated films containing an aluminum flake pigment is liable to change when it is exposed to various weather conditions. As means for evaluating the applicability of this kind of pigment, there have been employed the outdoor exposure test, accelerated weathering test, or the like. In particular, in order to examine the weather resistance of coated films, coated plates are exposed to high temperature high humidity conditions (blister box test) or immersed in hot water (hot water immersion test), and the deterioration in gloss and the change in color hue of the coated films are examined.

The cause of the deterioration in gloss and the change in color hue is believed to be due to water or water vapor penetrated into coated films. When this happens, micro-blisters are formed. The subsequent evaporation of water therefrom leaves holes in the coated films, and the thus-formed holes scatter light.

Nacreous pigments composed of mica flakes covered with metal oxides, such as titanium oxides, iron oxides or a combination of titanium oxides and iron oxides, have been used as coloring agents for coatings, inks, plastics, etc., in various applications, such as daily necessaries, toys, wrapping materials and the like. Recently, their uses have extended to outdoor applications, including the exterior coatings of automobiles, building materials, and the like.

However, in water resistance tests, such as the aforementioned blister box test and hot water immersion test, of hitherto known nacreous pigments, there were observed substantial deteriorations in gloss and changes in color, similar to those observed in aluminum flake pigments. It is therefore pointed out that the known nacreous pigments are not suited for coatings of outdoor use, in particular, for exterior coatings of automobiles.

In Japanese Patent Publication No. 4,147/80 are described metal oxide-coated mica pigments which were stabilized against severe weather conditions by means of a surface treatment using chromium compounds.

It is however disadvantageous to use such pigments treated with chromium compounds. Upon coating operations, part of these coatings fails to attach on articles to be coated. Therefore, if the coatings contain chromium-treated pigments, waste water from painting plants must be treated before being discharged to rivers or the like since, e.g., in Japan, chromium is placed under strict control by water pollution prevention law as a poisonous substance.

In addition, chromium compounds have deep green to grayish green color inherent thereto and, therefore, they are not suited for the production of, e.g., white nacreous pigments.

Most ordinary pigments are produced in the form of an agglomerated mass, which is then ground into powders having a usable granularity. On the other hand, nacreous pigments must not be pulverized or allowed to agglomerate from the time of their production to their actual use since coated films having a good nacreous luster can be obtained only when nacreous pigments are dispersed in the form of primary particles and arranged parallel to the surface of the coated films while maintaining their flakelike shapes. In other words, ordinary pigments are capable of providing sufficient color effects even when they are not in the state of primary particles, whereas it is absolutely necessary for nacreous pigments to be in the state of primary particles. However, it has not been possible to obtain nacreous pigments stabilized in the state of primary particles since they form agglomerates when stabilization techniques for ordinary pigments are applied thereto.

In the field of automobiles, demand for nacreous finishing has been increasing in recent years. It has been strongly desired in this field to develop nacreous pigments for outdoor use having both excellent gloss and excellent water resistance, without the use of chromium compounds.

The present invention provides a novel water-resistant nacreous pigment that meets the above requirements and a process for producing the same.

SUMMARY OF THE INVENTION

It is therefore an object of the invention to provide nacreous pigments stabilized sufficiently to severe weather conditions without using chromium compounds.

Upon further study of the specification and appended claims, further objects and advantages of this invention will become apparent to those skilled in the art.

These objects have been satisfied by the provision of a nacreous pigment composed of metal oxide-coated mica flakes (base pigment) having thereon a second covering that comprises hydrated zirconium oxide, and a process for producing the same.

More particularly, these objects have been satisfied by the present invention which provides a novel water-resistant nacreous or pearlescent pigment and a process for producing the same, which process comprises hydrolysing a zirconium or zirconyl compound in an aqueous medium in the presence of a hypophosphite, thereby depositing hydrated zirconium oxide onto the surface of metal oxide-coated mica flakes that function as a base pigment.

DETAILED DISCUSSION

The present inventors have found that water resistance of nacreous pigments can be improved by a covering of hydrated zirconium oxide formed under particular conditions. According to experiments by the inventors, known methods for forming coverings of hydrated zirconium oxide do not give good results since nacreous pigments having poor dispersibility are generated and, as a result, the color hue and the gloss of the original pigment (or base pigment) are impaired.

The water-resistant nacreous pigments according to the present invention can be prepared in the following manner: A salt of hypophosphorous acid and a salt capable of forming zirconium oxide are dissolved in an aqueous slurry of a base pigment at a temperature between 50° C. and the boiling point of the slurry; and the latter salt is then hydrolyzed so as to deposit hydrated zirconium oxide onto the surface of said pigment. By forming a covering of hydrated zirconium oxide on the surface of nacreous pigments in accordance with the above manner, the inventors succeeded in obtaining nacreous pigments having a good dispersibility and capable of forming a coated film having a markedly improved water resistance even when used outdoors.

Any of the ordinary mica flakes coated with metal oxides can be used as a base pigment in the process of the present invention. As examples of usable metal oxides, mention may be made of titanium oxides, iron oxides, tin oxides, chromium oxides, zirconium oxide, and mixtures of two or more of these metal oxides. The iron oxides can be of di- or trivalent irons, or mixtures thereof. It is preferable to use mica flakes coated with rutile type titanium oxide, mica flakes coated with an iron oxide and having thereon a titanium oxide layer, and mica flakes coated with iron oxides. These coated mica flakes are known as pigments and described, for example, in Japanese Patent Publication Nos. 3,824/74 and 49, 173/74; and Japanese Patent Application (Laid Open) Nos. 94,714/74, 128,027/74, 128,028/74, 17,910/76, 143,027/76 and 230/78.

The base pigment used in the invention may be those subjected beforehand to a fully conventional stabilization treatment utilizing such compounds as silicon, aluminum and zinc.

In general, the mica flakes to be used as a substrate for the base pigment are those having a diameter of about 2 to 200 μm and a thickness of about 0.1 to 5 μm. It is preferable to use mica flakes having a diameter of about 5 to 50μm and a thickness of about 0.2 to 0.9 μm.

As examples of water-soluble salts capable of forming hydrated zirconium oxide to be used in the process of the invention, mention may be made of such normal salts of zirconium as $ZrCl_4$, $Zr(NO_3)_4.5H_2O$ and $Zr(SO_4)_2.4H_2O$; and zirconyl salts, such as $ZrOCl_2.8H_2O$, $ZrO(NO_3)_2.2H_2O$, $ZrOSO_4.4H_2O$ and $ZrO(CH_3COO)_2$. Of these salts, $ZrOCl_2.8H_2O$ is preferred with regard to ease of handling and availability.

As examples of usable hypophosphites, mention may be made of $HPH_2O_2$, $NaH_2PO_2.H_2O$, $(NH_4)H_2PO_2$, $KH_2PO_2$, $Ca(H_2PO_2)_2$, $Mg(H_2PO_2)_2$, $Co(H_2PO_2)_2.6H_2O$, $Mn(H_2PO_2)_2.H_2O$, $Zn(H_2PO_2)_2.6H_2O$, $Pb(H_2PO_2)_2$, and the like. Of these hypophosphites, $NaH_2PO_2.H_2O$ is preferred with regard to solubility, nontoxicity of coexisting ions, availability, and the like.

As can be seen, the precise natures of the anion of the Zr-containing salt and the cation of the hypophosphite are not critical and need only be compatible with the underlying process.

Preferable embodiments of the invention will be explained hereinbelow in detail.

A base pigment is dispersed into water at room temperature to give a slurry containing 5 to 15% by weight of said pigment, and the pH of the resulting slurry is adjusted to 1 to 2 by the addition of hydrochloric acid or the like. To this is added a zirconium or zirconyl salt or an aqueous solution thereof, and the resulting slurry is heated with stirring to a temperature between 50° C. and the boiling point of said slurry. An aqueous solution of a hypophosphite is gradually added thereto with stirring, and the stirring was continued for a while, thereby maintaining the temperature of the system. The pH of the resulting slurry was increased to 4 to 9 by the addition of an aqueous alkaline solution, e.g., with an aqueous sodium hydroxide solution. In this operation, said aqueous alkaline solution should not be added quickly. It is therefore preferred to use a device capable of supplying it at a constant rate. The mixture is stirred for at least 30 minutes while maintaining the temperature of the system. Thereafter, the product is collected by filtration, washed with water, and dried at a temperature of 80° to 130° C.

In another embodiment of the invention, a slurry containing a base pigment in an amount of 5 to 15% by weight is heated to a temperature between 50° C. and the boiling point of said slurry. To this are added dropwise an aqueous solution of a zirconium salt or a zirconyl salt and an aqueous solution of a hypophosphite at constant rates and at a fixed ratio, during which the slurry is stirred and its pH value is maintained at a constant value between 2 to 6 by the addition of an aqueous alkaline solution, e.g., an aqueous sodium hydroxide solution. After the completion of the addition of prescribed amounts of said solutions, the slurry is stirred for at least 30 minutes while maintaining the system at the same temperature. Thereafter, the product is collected by filtration, washed with water, and dried at a temperature of 80° to 130° C.

In still another embodiment of the invention, an aqueous solution of a hypophosphite is added dropwise with stirring to an aqueous solution of a zirconium salt or a zirconyl salt as mentioned above, and the resulting solution is added with stirring to an aqueous 5 to 15% by weight slurry of a base pigment. The resulting slurry is then heated with stirring until it reaches a boiling state, and the boiling state is maintained for at least 90 minutes. To this is gradually added with stirring an aqueous alkaline solution, e.g., an aqueous sodium hydroxide solution, by use of a constant rate pump or the like. The stirring of the slurry was continued for at least 30 minutes while maintaining it at the boiling point. The product is collected by filtration, washed with water, and dried at a temperature of 80° to 130° C.

In the above preparations, the water-soluble salts capable of forming hydrated zirconium oxide are generally used in an amount of about 0.01 to 0.05 mol., preferably about 0.005 to 0.03 mol., per 100 g of said base pigment, and the hypophosphites and the zirconium compounds are used in such ratios that the ratio of phosphite ions to zirconium ions in solution is about 1:2 to 10:1, preferably about 1:1 to 3:1.

In the processes described above, the aqueous solution of the zirconium-containing salts can be additionally incorporated with water-soluble salts of other metals, such as aluminum, zinc, tin, cobalt, manganese, chromium and the like with anions such as those mentioned for Zr. In addition, the aqueous solution of hypophosphites and/or the aqueous alkaline solution can be additionally incorporated with aluminates, zincates, silicates, phosphates, etc., in an amount not inhibiting the formation of hydrated zirconium oxide. Incorporation of such other metals is in principle known and is effected conventionally for conventional purposes.

In order to enhance the water resistance of the nacreous pigment of the invention and to improve its affinity for coatings, the base pigment having thereon deposited hydrated zirconium oxide can be subjectd to a post-treatment using a coupling agent, such as silane coupling agents and the like.

In general, silane coupling agents are considered to act on an interface between an organic material and an inorganic material to play a role as a binder for the two materials.

Examples of useful silane coupling agents include the following:

γ-(2-Aminoethyl)aminopropyltrimethoxysilane
γ-(2-Aminoethyl)aminopropylmethyldimethoxysilane
γ-Methacryloxypropyltrimethoxysilane
N-β-(N-Vinylbenzylaminoethyl)-γ-aminopropyltrimethoxysilane
γ-Glycidoxypropyltrimethoxysilane
γ-Mercaptopropyltrimethoxysilane
Vinyltriacetoxysilane
γ-Chloropropyltrimethoxysilane
Vinyltrimethoxysilane
Octadecyldimethyl[3-(trimethoxysilyl)propyl]ammonium chloride
γ-Mercaptopropylmethyldimethoxysilane
Methyltrichlorosilane
Dimethoxydichlorosilane
Trimethylchlorosilane It is advantageous to select a silane coupling agent having a functional group compatible with organic vehicles into which the pigment is dispersed. For example, it is preferred, in the case of acrylic resin vehicles, to use such coupling agents as γ-(2-aminoethyl)aminopropyltrimethoxysilane, γ-methacryloxypropyltrimethoxysilane, γ-gycidoxypropyltrimethoxysilane and the like.

The treatment with a silane coupling agent can be effected in the following manner: A silane coupling agent is dissolved in water or an aqueous medium, and the resulting solution is added with stirring to an aqueous slurry containing said nacreous pigment having a coating of hydrated oxides. The stirring is continued for at least 15 minutes after the completion of the addition. Thereafter, the product is collected by filtration, washed with water, and dried at a temperature of 80° to 130° C.

The concentration of the silane coupling agent contained in the aforementioned solution can be from 0.1 to 5% by weight, and the solution preferably contains the agent in quantities corresponding to 0.1 to 3%, more preferably 0.5 to 2%, of the total weight of the untreated pigment.

The nacreous pigment provided by the present invention possesses a water resistance which is satisfactory as a coloring agent for outdoor use, particularly as an exterior coating of automobiles. In addition, the pigment has an excellent dispersibility, and the color hue and the gloss of the original pigment or the base pigment used as a substrate therefor are not at all impaired.

The pigment according to the present invention is used in a fully conventional manner and can exhibit good properties not only in coatings for outdoor use, but also in other conventional materials, such as plastics to be used outdoors, as well as in other vehicles, and the like. The amount of hydrated zirkonium oxide deposited on the pigment substrate is typically about 0.1–6 wt. % based on the total weight of the pigment and calculated as $ZrO_2$, preferably about 0.5–4 Wt. %.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

EXAMPLE 1

In 500 ml of water were suspended 50 g of mica flakes coated with about 45% by weight of iron oxide, and having a mass tone of Indian Red, a red reflection color and a grain size of from 10 to 50 μm (Iriodin 504 manufactured by E. Merck A.G.). To this suspension were added with stirring 30 g of an aqueous 3.5% by weight solution of hydrochloric acid and 1.44 g of zirconium oxychloride [$ZrOCl_2.8H_2O$], and the resulting slurry mixture was heated to 75° 1 C. An aqueous 1% by weight solution of sodium hypophosphite [$NaH_2PO_2.H_2O$] was prepared by dissolving 1.28 g of sodium hypophosphite in water, and the solution was added with stirring to the slurry over a period of 20 minutes. The stirring was continued for an additional 30 minutes at 75° C. To this was dropped with stirring an aqueous 1% by weight solution of sodium hydroxide at a rate of 6 ml/min until its pH value rose to 9, and the stirring was continued for an additional 30 minutes.

The solid product formed was collected by filtration, washed with water, and then dried at 120° C.

The thus-obtained pigment was mixed with water or lacquer and observed under a microscope. In both cases, the pigment showed good dispersibility.

The pigment was mixed with a thermosetting acryl-melamine resin (a mixture of Acrydik 47–712 and Super Beckmin G 821–60 in a ratio of 7:1 by weight, both manufactured by Dainippon Ink & Chemicals, Inc.) to give a mixture containing the pigment in an amount of about 10% by weight. The resulting mixture was sprayed onto a steel plate subbed with a black enamel (Superlac F-47 manufactured by Nippon Paint Co., Ltd.). A top clear of a thermosetting acryl-melamine resin (a mixture of Acrydik 44–179 and Super Beckmin L 117–60 in a ratio of 7:3 by weight, both manufactured by Dainippon Ink and Chemicals, Inc.) was further sprayed thereon by a wet-on-wet method, and the sprayed plate was baked at 180° C. for 18 minutes. The baked plate was immersed in hot water of 80° C. and allowed to stand for 3 hours. Thereafter, the plate was cooled to room temperature and taken out, and the change in its appearance was visually inspected (hot water immersion test).

The pigment showed almost no color change and the surface of the coated plate was still glossy. On the other hand, when a coated plate was prepared in the same manner as above by using the base pigment (Iriodin 504) per se, and the resulting plate was subjected to the same hot water immersion test, the pigment showed an enhanced orange color and the surface gloss of the coated film disappeared.

COMPARATIVE EXAMPLE 1

In 500 ml of water were suspended 50 g of the same iron oxide-coated mica flakes as in Example 1. To this suspension were added 2.6 g of zirconium oxychloride [$ZrOCL_2.8H_2O$] and 10 g of urea [$CO(NH_2)_2$], and the resulting mixture was heated with stirring over a period of about 30 minutes up to its reflux temperature. The reaction system was stirred under reflux for about an additional 30 minutes to raise its pH to 7.

The solid product was collected by filtration, washed with water, and dried at 120° C.

The thus-prepared pigment was mixed with water or lacquer and observed under a microscope. In either case, particles of the pigment were overlapped and many of them agglomerated. When it was mixed with an ink medium and sprayed on a paper, it gave color and gloss completely different from those of the original pigment.

A coated plate was prepared in the same manner as in Example 1 by using this pigment, and the plate was subjected to the same hot water immersion test as in Example 1. Although the pigment showed little color change, the gloss of its surface showed a considerable decrease.

COMPARATIVE EXAMPLE 2

In 500 ml of water was suspended the same iron oxide-coated mica flakes as in Example 1. To the resulting suspension was gradually added with stirring 26.2 g of aqueous 10% by weight solution of zirconium oxychloride. After the completion of the addition, the resulting mixture was heated to 75° C. Thereafter, ammonium water ($NH_4OH$: 14.5%) was added slowly thereto over a period of 3 hours to raise its pH value to 7.5.

The solid product was collected by filtration, washed with water, and dried at 120° C.

The thus-obtained pigment was mixed with water or lacquer and observed under a microscope. In either case, the particles of the pigment agglomerated. When it was mixed with an ink medium and spread on a paper, it gave color and gloss completely different from those of the original pigment.

A coated plate was prepared in the same manner as in Example 1 by using this pigment, and the plate was subject to the same hot water immersion test as in Example 1. There was observed a little change in its color, and the gloss showed a considerable decrease.

EXAMPLE 2

In 500 ml of water was suspended 50 g of the same iron oxide-coated mica flakes as in Example 1. To this were added with stirring 30 g of aqueous 3.5% by weight solution of hydrochloric acid and 1.00 g of zirconium oxyacetate [$ZrO(CH_3COO)_2$], and the resulting mixture was heated to 75° C. An aqueous 1% by weight solution of sodium hypophosphite [$NaH_2PO_2.H_2O$] was prepared by dissolving 1.24 g of sodium hypophosphite into water, and the solution was added with stirring to the slurry over a period of 45 minutes. After the completion of the addition, the slurry was stirred for an additional 30 minutes at 75° C. To this slurry was dropped with stirring an aqueous 5% by weight solution of sodium hydroxide at a rate of 1 ml/min to raise its pH value to 7.0, and the stirring was continued for an additional 30 minutes at 75° C.

The solid product was collected by filtration, washed with water, and dried at 120° C.

The thus-obtained pigment was mixed with water or lacquer and observed under a microscope. In either case, it showed a good dispersibility.

A coated plate was prepared in the same manner as in Example 1 by using this pigment, and the plate was subjected to the same hot water immersion test as in Example 1. The pigment showed almost no color change, and the surface of the coated film remained glossy.

EXAMPLE 3

In 500 ml of water was suspended 50 g of the same iron oxide-coated mica flakes as in Example 1. To this were added with stirring 30 g of 3.5% by weight solution of hydrochloric acid and 1.19 g of zirconium oxynitrate [$ZRO(NO_3)_2.2H_2O$], and the resulting mixture was heated to 75° C. An aqueous 1% by weight solution of sodium hypophosphite [$NaH_2PO_2.H_2O$] was prepared by dissolving 1.89 g of sodium hypophosphite into water, and the solution was added with stirring to the suspension over a period of 25 minutes. After the completion of the addition, the suspension was stirred for an additional 30 minutes at 75° C. To this was dropped with stirring an aqueous 5% by weight solution of sodium hydroxide at a rate of 1 ml/min to raise its pH value to 7.2, and the stirring was continued for an additional 30 minutes at 75° C.

The solid product was collected by filtration, washed with water, and dried at 120° C.

The thus-obtained pigment was mixed with water or lacquer and observed under a microscope. In either case, it showed a good dispersibility.

A coated plate was prepared in the same manner as in Example 1 by using this pigment, and the plate was subjected to the same hot water immersion test as in Example 1. The pigment showed almost no color change, and the surface of the coated film remained glossy.

EXAMPLE 4

In 500 ml of water was dissolved 50 g of the same iron oxide-coated mica flakes as in Example 1. To this suspension were added with stirring 3.5% by weight solution of hydrochloric acid and 2.88 g of zirconium oxychloride [$ZrOCl_2.8H_2O$], and the resulting mixture was heated to 75° C. An aqueous 1% by weight solution of sodium hypophosphite [$NaH_2PO_2.H_2O$] was prepared by dissolving 1.89 g of sodium hypophosphite into water, and the solution was added with stirring to the suspension over a period of 65 minutes. After the completion of the addition, the suspension was stirred for an additional 30 minutes at 75° C. To this was dropped with stirring an aqueous 5% by weight solution of sodium hydroxide at a rate of 1 ml/min to raise its pH value to 7, and the stirring was continued for an additional 30 minutes at 75° C. The solid product formed was collected by filtration, washed with water, and dried at 120° C.

The thus-obtained pigment was mixed with water or lacquer and observed under a microscope. In either case, it showed a good dispersibility.

A coated plate was prepared in the same manner as in Example 1 by using this pigment, and the plate was subjected to the same hot water immersion test as in Example 1. The pigment showed almost no color change, and the surface of the coated film remained glossy.

EXAMPLE 5

The procedure in Example 1 was repeated, using the same materials in the same quantities, except that the temperature of the slurry was maintained at 50° C.

The pigment obtained was mixed with water or lacquer and observed under a microscope. In either case, it showed a good dispersibility.

A coated plate was prepared in the same manner as in Example 1 by using this pigment, and the plate was subjected to the same hot water immersion test as in Example 1. It showed almost no color change, and the surface of the coated film remained glossy.

EXAMPLE 6

Mica flakes coated with about 28% by weight, based on their total weight, of rutile-type titanium dioxide, and having a mass tone of grayish white, a white reflection color and a grain size of from 10 to 50 μu (Iriodin 103 Sterling Silver manufactured by E. Merck A.G.) were treated in the same manner as in Example 1 to form thereon a covering of hydrated zirconium oxide.

The thus-obtained pigment was mixed with water or lacquer and observed under a microscope. In either case, it showed a good dispersibility.

A coated plate was prepared in the same manner as in Example 1 by using this pigment, and the plate was subjected to the same hot water immersion test as in Example 1. It showed almost no whitening, and the surface of the coated film remained glossy.

EXAMPLE 7

In 500 ml of water was suspended the same iron oxide-coated mica flakes as in Example 1, and hydrochloric acid was added thereto with stirring to adjust its pH value to 7.0. The resulting slurry was heated to 75° C., and then (1) an aqueous solution prepared from 0.6 g of $ZnCl_2$, 1.44 g of $ZrOCl_2.8H_2O$, 30 g of aqueous 3.5% by weight solution of hydrochloric acid and 100 ml of water, and (2) an aqueous solution prepared by dissolving 0.94 g of $NaH_2PO_2.H_2O$ into 130 ml of water were simultaneously added dropwise to the slurry with stirring at a rate of 3 ml/min each, during which the pH of the slurry was maintained at 2 by the addition of an aqueous 5% by weight solution of NaOH. After the completion of the addition of aqueous solutions (1) and (2), the slurry was stirred for an additional 30 minutes at 75° C., and its pH was raised to 5.5 by dropping thereto an aqueous 10% by weight solution of NaOH at a rate of 0.6 ml/min. After being stirred for additional 30 minutes at 75° C., the slurry was filtered to collect the solid product, which was then washed with water and dried.

The thus-obtained pigment was mixed with water or lacquer and observed under a microscope. In either case, it showed a good dispersibility.

A coated plate was prepared in the same manner as in Example 1 by using this pigment, and then subjected to the same hot water immersion test as in Example 1. It showed almost no color change, and the surface of the coated film remained glossy.

EXAMPLES 8-10

In 1,250 ml of water was suspended 125 g of the same iron oxide-coated mica flakes as in Example 1. To this suspension was added with stirring 1.5 g of zinc chloride [$ZnCl_2$], and the resulting mixture was heated to 75° C. The pH value of the mixture was raised from 3.86 to 8.53 by adding thereto an aqueous 1% by weight solution of sodium hydroxide over a period of 92 minutes, and the resulting slurry was stirred for an additional 48 hours at 75° C. Thereafter, it was filtered to collect the solid product, which was then washed with water and dried. In 1,000 ml of water was suspended 100 g of the dried product. To this were added with stirring 60 g of an aqueous 3.5% by weight solution of hydrochloric acid and 2.88 g of zirconium oxychloride [$ZrOCl_2.8H_2O$]. The resulting mixture was heated to 75° C., and then an aqueous 1% by weight solution of 1.88 g of sodium hypophosphite [$NaH_2PO_2.H_2O$] was added thereto with stirring over a period of 50 minutes. After being stirred for an additional 75 minutes at 75° C., the slurry was divided into three portions, and the divided portions were neutralized with an aqueous 5% by weight solution of potassium hydroxide [Example 8], ammonium hydroxide [Example 9] or ammonium carbonate [Example 10], respectively. The thus-obtained slurries were filtered to collect solid products, which were then washed with water and dried.

The thus-obtained pigments were separately mixed with water or lacquer and observed under a microscope. In all cases, the pigments showed a good dispersibility.

Coated plates were prepared in the same manner as in Example 1 by using these pigments, and the plates were subjected to the same hot water immersion test as in Example 1. In all cases, the pigments showed almost no color change, and the surfaces of the coated films remained glossy.

EXAMPLE 11

In 10 liters of water was suspended 1 kg of the same iron oxide-coated mica flakes as in Example 1. To this was added 13.6 g of zinc chloride, and the resulting mixture was heated to 75° C. An aqueous 10% by weight solution of sodium hydroxide was added thereto with stirring at a rate of 0.6 ml/min to raise its pH value to 8.3. The product was collected by filtration, washed with water, and dried at 120° C. to give 950 g of particles of a pigment covered with hydrated zinc oxide. The pigment was suspended in 9.5 liters of water, and the suspension was treated in the same manner as in Example 1, with the exception that other materials were used in 19-fold quantities.

The solid product formed was collected by filtration, washed with water, and then resuspended in 9 liters of water. To the resulting suspension was added an aqueous 1% by weight solution of 9.5 g of silane coupling agent: γ-glycidoxypropyl trimethoxysilane (SH 6040 manufactured by Toray Silicone Co., Ltd.), and the resulting mixture was stirred for 30 minutes at room temperature.

The solid product obtained was collected by filtration and dried at 120° C.

The thus-obtained pigment was mixed with water or lacquer and observed under a microscope. In either case, it showed a good dispersibility.

The pigment also showed a good dispersibility even when admixed with a solvent having a low polarity, such as toluene or the like. When water was added to a suspension of this pigment in toluene, the pigment did not pass into an aqueous phase. On the other hand, in the case where water was added to a suspension in toluene of the above pigment not treated with the silane coupling agent, most of the pigment migrated into the aqueous phase. This shows that the treatment with the silane coupling agent intensified the lipophilicity of the pigment.

A coated plate was prepared in the same manner as in Example 1 by using the pigment treated with the silane coupling agent, and the plate was subjected to the same hot water immersion test as in Example 1. Its color showed almost no change, and the surface of the coated film remained in a sufficiently glossy state.

Another coated plate was prepared in a similar manner as in Example 1, except that the pigment was used at a concentration of 5% by weight. The plate was subjected to an accelerated weathering test of 600 hours under conditions according to JIS (Japanese Industrial Standard) D 0205, by use of a Sunshine Carbon Arc Meter Model WEL-SUN-HC (manufactured by Suga Tester Co., Ltd.). Its color was measured before and after the test by use of a color-difference meter (Model D-25 manufactured by Hanter Labo Corp.), and the color difference ΔE of the plate before and after the test was calculated therefrom. There was obtained a ΔE value of 0.3.

EXAMPLE 12

In 5 liters of water was suspended 500 g of mica flakes coated with about 45% by weight of rutile type titanium dioxide having a reflection color of blue, a transmission color of yellow and a grain size of from 10 to 50 μ (Iriodin 225 Rutile Blue manufactured by E. Merck A.G.). To this suspension was added a solution prepared by dissolving 60 g of concentrated hydrochloric acid, 13.6 g of zinc chloride [$ZnCl_2$] and 28.8 g of zirconium oxychloride [$ZrOCl_2.8H_2O$] into 200 ml of water, and the resulting mixture was heated with stirring up to a temperature of 75° C. Thereafter, an aqueous 10% by weight solution of 18.8 g of sodium hypophosphite [$NaH_2PO_2.H_2O$] was added to the mixture over a period of 55 minutes, and its temperature was maintained at 75° C. with stirring for 30 minutes. With stirring at the same temperature, an aqueous 10% by weight solution of sodium hydroxide was added dropwise to the mixture at a rate of 5.3 ml/min to raise its temperature to 7.0. The mixture was stirred for 30 minutes at the same temperature, its pH was then lowered to 5.0 by the addition of hydrochloric acid, and the resulting mixture was stirred for an additional 30 minutes at the same temperature.

Thereafter, an aqueous 1% by weight solution of a silane coupling agent: γ-glycidoxylpropyl trimethoxysilane (SH 6040 manufactured by Toray Silicone Co., Ltd.), which had been prepared by dissolving 5 g of said coupling agent into water, was added to the mixture, and the resulting mixture was stirred for 30 minutes at 75° C.

The solid product was collected by filtration, washed with water, and dried at 120° C.

The thus-obtained pigment was mixed with water or lacquer and observed under a microscope. In either case, the pigment showed a good dispersibility.

The pigment also showed a good dispersibility even when admixed with a solvent having a low polarity, such as toluene or the like. When water was added to a suspension of the pigment in toluene, the pigment did not pass into the aqueous phase. This shows that the lipophilicity of the pigment was intensified by the treatment with the silane coupling agent. The pigment did not show such a phenomenon when not treated with the silane coupling agent.

Coated plates were prepared in the same manner as in Example 1, by using the silane-treated pigment and the base pigment (Iriodin 225), and the plates were subjected to the same hot water immersion test as in Example 1. The coated plate prepared from the silane-treated pigment according to the invention showed no whitening, and the surface of the film remained glossy, whereas the coated plate prepared from the base pigment showed a considerable whitening and the gloss of its coated surface disappeared.

Another coated plate was prepared in the same manner as in Example 11 by use of the silicone-treated pigment. The plate was subjected to the same accelerated weathering test, using the same device under the same conditions as in Example 11, and the change of its color before and after the test was determined. There was obtained a color difference ΔE of 2.0. In the same test, a coated plate prepared from the base pigment showed a ΔE value of 2.0. This shows that the pigment according to the invention has an improved stability over the base pigment.

EXAMPLE 13

At room temperature, an aqueous 1% by weight solution of 1.88 g of $NaHPO_2.H_2O$ was gradually added with stirring to an aqueous 10% by weight solution of 2.88 g of zirconium oxychloride [$ZrOCl_2.8H_2O$], whereby the rate of addition of the solution was so controlled that a transparent solution could be formed without generating white precipitates. In 500 ml of water was added 50 g of the same titanium oxide-coated mica flakes as in Example 1. This suspension was added with stirring to the transparent aqueous solution prepared above, and the resulting mixture was heated with stirring up to its boiling temperature. After it had been maintained under the same conditions for 2 hours, an aqueous 1% by weight solution of sodium hydroxide was added thereto at a rate of 1.3 ml/min to raise its pH to 7.0, and the resulting mixture was stirred under reflux for 30 minutes.

The solid product formed was collected by filtration, washed with water, and dried at 120° C.

The thus-treated pigment was mixed with water or lacquer and observed under a microscope. In either case, it showed a good dispersibility.

A coated plate was prepared by using this pigment in the same manner as in Example 1, and the plate was subjected to the same hot water immersion test. The plate showed no substantial whitening, and its surface remained glossy.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a water-resistant nacreous pigment, comprising hydrolyzing a zirconium or zirconyl compound, in the presence of a hypophosphite and in the presence of a metal oxide-coated mica flake pigment, whereby a hydrated zirconium oxide is deposited onto the surface of the metal oxide-coated mica flake.

2. A process according to claim 1, wherein a salt of hypophosphorous acid and a salt capable of forming zirconium oxide under hydrolysis conditions are dissolved in an aqueous slurry of a metal oxide-coated mica flake pigment, and the salt capable of forming zirconium oxide is hydrolyzed so as to deposit hydrated zirconium oxide onto the surface of the metal oxide-coated mica flake.

3. A process according to claim 1, wherein the pigment is a mica flake coated with a titanium oxide, an iron oxide, a tin oxide, a chromium oxide, a zirconium oxide, or with a mixture of said oxides.

4. A process according to claim 1, wherein the mica flakes have a diameter of about 2-200 μm and a thickness of about 0.2-0.9 μm.

5. A process according to claim 2, wherein the salt capable of forming zirconium oxide is $ZrCl_4$, $Zr(NO_3)_4 \cdot 5H_2O$, $Zr(SO_4)_2 \cdot 4H_2O$, $ZrOCl_2 \cdot H_2O$, $ZrO(NO_3)_2 \cdot 2H_2O$, $ZrOSO_4 \cdot 4H_2O$ or $ZrO(CH_3COO)_2$.

6. A process according to claim 2, wherein salt of hypophosphorous acid is $HPH_2O_2NaH_2PO_2 \cdot H_2O$, $(NH_4)H_2PO_2$, $KH_2PO_2$, $Ca(H_2PO_2)_2$, $Mg(H_2PO_2)_2$, $Co(H_2PO_2)_2 \cdot 6H_2O$, $Mn(H_2PO_2)_2 \cdot H_2O$, $Zn(H_2PO_2)_2 \cdot 6H_2O$ or $Pb(H_2PO_2)_2$.

7. A process according to claim 2, wherein the salt capable of forming zirconium oxide is $ZrOCl_2 \cdot H_2O$ and the salt of hypophosphorous acid is $NaH_2PO_2 \cdot H_2O$.

8. A process according to claim 2, wherein the aqueous slurry contains 5-15% by weight of the pigment.

9. A process according to claim 2, wherein the salt capable of forming zirconium oxide is present in an amount of about 0.01-0.05 mol/100 g of pigment.

10. A process according to claim 2, wherein the ratio of phosphite/zirconium ions in the slurry is about 1:2-10:1.

11. A process according to claim 2, wherein the temperature of the slurry is about 50° C. - slurry boiling point.

12. A process according to claim 2, wherein a silane coupling agent in aqueous solution is added under stirring to a resultant aqueous slurry containing the metal oxide-containing mica flake pigment having hydrated zirconium oxide deposited on the surface thereof.

* * * * *

UNITED STATES PATENT AND TRADEMARK OFFICE
CERTIFICATE OF CORRECTION

PATENT NO. : 4,828,623

DATED : May 9, 1989

INVENTOR(S) : Katsuhisa Nitta et al

It is certified that error appears in the above-identified patent and that said Letters Patent is hereby corrected as shown below:

Column 13, line 16: reads "hypophosphorous acid is $HPH_2O_2NaH_2PO_2 \cdot H_2O$,"

should read -- hypophosphorous acid is $HPH_2O_2$, $NaH_2PO_2 \cdot H_2O$, --

Signed and Sealed this

Fifteenth Day of August, 1989

Attest:

DONALD J. QUIGG

*Attesting Officer*  *Commissioner of Patents and Trademarks*